United States Patent
Hung

(10) Patent No.: US 9,261,660 B2
(45) Date of Patent: Feb. 16, 2016

(54) OPTICAL COUPLING LENS, OPTICAL COMMUNICTION DEVICE, AND METHOD FOR ASSEMBLING SAME

(71) Applicant: HON HAI PRECISION INDUSTRY CO., LTD., New Taipei (TW)

(72) Inventor: Yi Hung, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/326,487

(22) Filed: Jul. 9, 2014

(65) Prior Publication Data

US 2016/0011384 A1 Jan. 14, 2016

(51) Int. Cl.
*G02B 6/32* (2006.01)
*G02B 6/42* (2006.01)

(52) U.S. Cl.
CPC ............ *G02B 6/4214* (2013.01); *G02B 6/4221* (2013.01); *G02B 6/4244* (2013.01)

(58) Field of Classification Search
CPC ........ G02B 6/32; G02B 6/4214; G02B 6/124; G02B 6/2937; G02B 7/022
USPC .................................. 385/33, 88–92; 29/832
See application file for complete search history.

(56) References Cited

U.S. PATENT DOCUMENTS

| | | | |
|---|---|---|---|
| 6,075,635 A * | 6/2000 | Butrie et al. .................. 398/139 |
| 6,282,000 B1 * | 8/2001 | Kikuchi et al. ............... 398/136 |
| 6,491,447 B2 * | 12/2002 | Aihara ............................ 385/92 |
| 6,921,214 B2 * | 7/2005 | Wilson ............................ 385/89 |
| 6,939,058 B2 * | 9/2005 | Gurevich et al. ............... 385/93 |
| 7,198,416 B2 * | 4/2007 | Ray et al. ......................... 385/93 |
| 7,918,610 B2 * | 4/2011 | Fujiwara et al. ................ 385/88 |
| 8,469,610 B2 * | 6/2013 | Shao et al. ...................... 385/93 |
| 8,641,296 B2 * | 2/2014 | Nishimura ...................... 385/92 |
| 8,737,784 B2 * | 5/2014 | Kawai ............................. 385/47 |
| 8,967,886 B2 * | 3/2015 | Kuo ................................. 385/93 |
| 9,020,352 B2 * | 4/2015 | Shin ................................. 398/82 |
| 2004/0202477 A1 * | 10/2004 | Nagasaka et al. ............. 398/138 |
| 2008/0166136 A1 * | 7/2008 | Birincioglu et al. .......... 398/212 |
| 2012/0008899 A1 * | 1/2012 | Morioka ......................... 385/33 |
| 2012/0027345 A1 * | 2/2012 | Castagna et al. ............... 385/33 |

\* cited by examiner

*Primary Examiner* — Ellen Kim

(74) *Attorney, Agent, or Firm* — Novak Druce Connolly Bove + Quigg LLP

(57) ABSTRACT

An optical coupling lens includes a first lens portion and a second lens portion. The first lens portion includes a first main body and at least one first lenses. The first main body includes a first optical surface and a reflecting surface inclined at a predetermined angle relative to the first optical surface. The first lens is formed on the first optical surface. The second lens portion includes a second main body and at least one second lens. The second main body includes a second optical surface, a bottom surface, and a top surface opposite to the bottom surface. The second lens is formed on the second optical surface. The second lens portion defines a receiving hole passing through the bottom surface and the top surface. The first lens portion is detachably received in the receiving hole with the first optical surface facing toward the bottom surface.

13 Claims, 5 Drawing Sheets

US 9,261,660 B2

OPTICAL COUPLING LENS, OPTICAL COMMUNICTION DEVICE, AND METHOD FOR ASSEMBLING SAME

FIELD

The present disclosure relates to an optical coupling lens, an optical communication device having the optical coupling lens, and a method for assembling the optical communication device.

BACKGROUND

In optical communication devices, an optical coupling lens optically couples optical signals between an optical fiber and an optical emitter/receiver. The optical coupling lens includes a first surface having at least one first optical lens formed thereon, a second surface having at least one second optical lens formed thereon, and a third surface for reflecting optical signals between the first surface and the second surface.

BRIEF DESCRIPTION OF THE DRAWING

The components of the drawing are not necessarily drawn to scale, the emphasis instead being placed upon clearly illustrating the principles of the embodiments of the present disclosure.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one." The references "a plurality of" and "a number of" mean "at least two."

Figure 1:
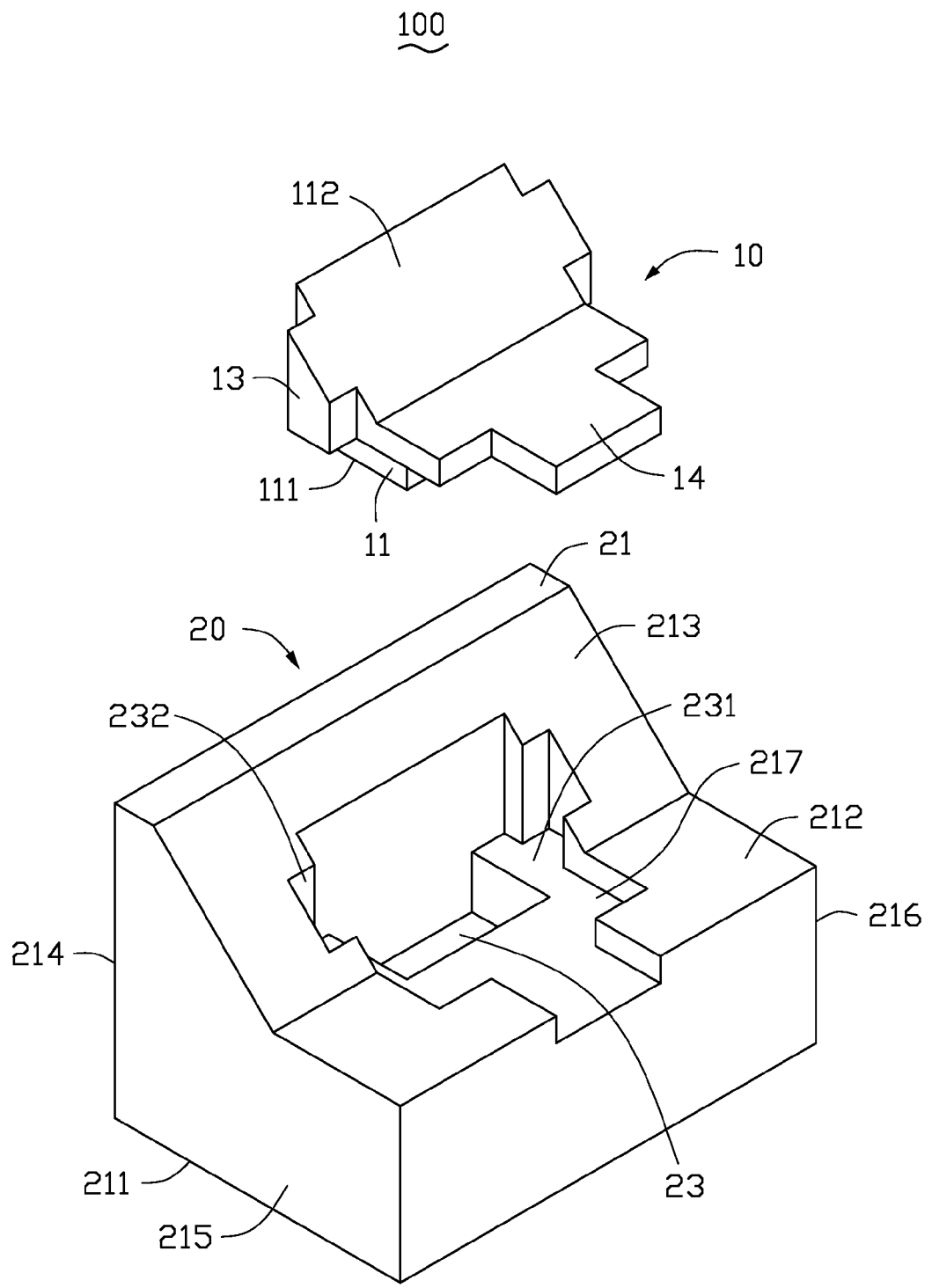
FIG. 1 is an isometric view of an embodiment of an optical coupling lens.
Figure 2:
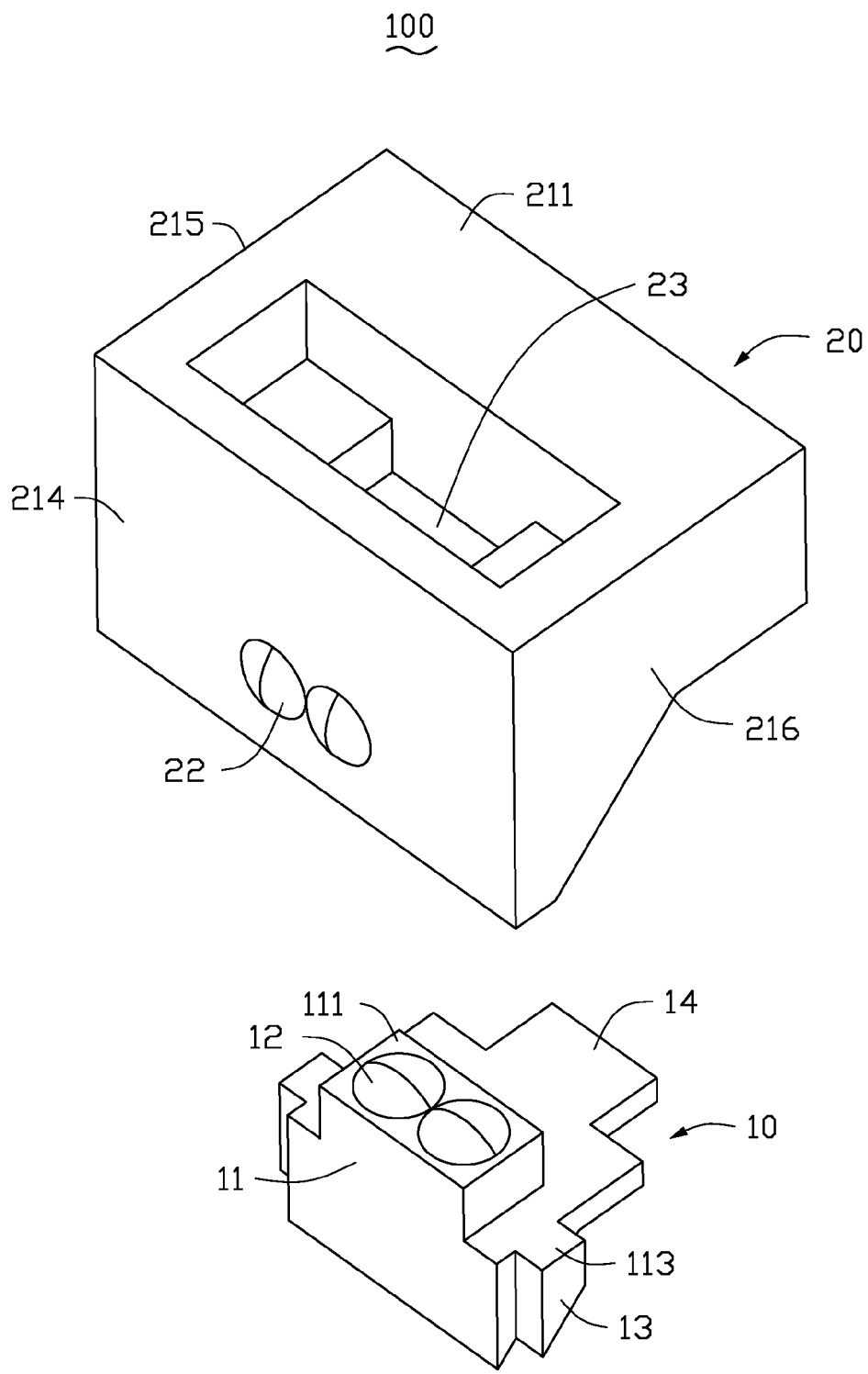
FIG. 2 is similar to FIG. 1, but viewed from another angle.

FIGS. 1-2 illustrate an embodiment of an optical coupling lens 100. The optical coupling lens 100 includes a first lens portion 10 and a second lens portion 20. The first lens portion 10 and the second lens portion 20 can be detachably connected to each other.

The first lens portion 10 includes a first main body 11. The first main body 11 includes a first optical surface 111 and a reflecting surface 112 opposite to the first optical surface 111. The reflecting surface 112 is inclined at a predetermined angle relative to the first optical surface 111. In this embodiment, an angle between the first optical surface 111 and the reflecting surface 112 is substantially 45 degrees. The first main body 11 includes a stepped supporting portion 113 between the first optical surface 111 and the reflecting surface 112.

The first lens portion 10 includes two first lenses 12 formed on the first optical surface 111 of the first main body 11. An optical axis of each first lens 12 is substantially perpendicular to the first optical surface 111. In this embodiment, the first lenses 12 are circular convex lenses. In other embodiments, a number of the first lenses 12 can be changed according to different requirements.

The first lens portion 10 includes two engaging blocks 13 protruding from two opposite ends of the first main body 11, respectively. The first lens portion 10 further includes a tail end 14 extending from a side of the first main body 11.

In this embodiment, the engaging blocks 13 and the tail end 14 are integrally formed with the first main body 11. Alternatively, the engaging blocks 13 and the tail end 14 can be connected to the first main body 11 by an adhesive or a locking structure.

The second lens portion 20 includes a second main body 21. The second main body 21 includes a bottom surface 211, a top surface 212 opposite to the bottom surface 211, an inclined surface 213 connected to the top surface 212 and inclined at a predetermined angle relative to the top surface 212, a second optical surface 214, a first end surface 215, and a second end surface 216 opposite to the first end surface 215. The bottom surface 211 and the top surface 212 are substantially parallel to each other. The second optical surface 214 is connected to, and substantially perpendicular, to the bottom surface 211. The first end surface 215 and the second end surface 216 are substantially parallel to each other. In this embodiment, an angle between the top surface 212 and the inclined surface 213 is substantially 135 degrees.

The second lens portion 20 includes two second lenses 22 formed on the second optical surface 214. An optical axis of each second optical lens 22 is substantially perpendicular to the second optical surface 214. An arrangement of the second optical lenses 22 corresponds to an arrangement of the first lenses 12.

The second lens portion 20 defines a receiving hole 23 for receiving the first lens portion 10 therein. The receiving hole 23 passes through the bottom surface 211, the top surface 212, and the inclined surface 213. The receiving hole 23 is stepped. A size of a portion of the receiving hole 23 adjacent to the top surface 212 is larger than a size of a portion of the receiving hole 23 adjacent to the bottom surface 211. Thus, a step 231 is formed between the two portions of the receiving hole 23. A shape and size of the step corresponds to a shape and size of the supporting portion 113. The second lens portion 20 further defines two engaging grooves 232 and a receiving recess 217. The engaging grooves 232 correspond to the engaging blocks 13, and the receiving recess 217 corresponds to the tail end 14. The engaging grooves 232 are defined in opposite inner surfaces of the second main body 21, respectively. The receiving recess 217 is defined in the top surface 212 and passes through an inner surface and an outer surface of the second main body 21.

Figure 3:
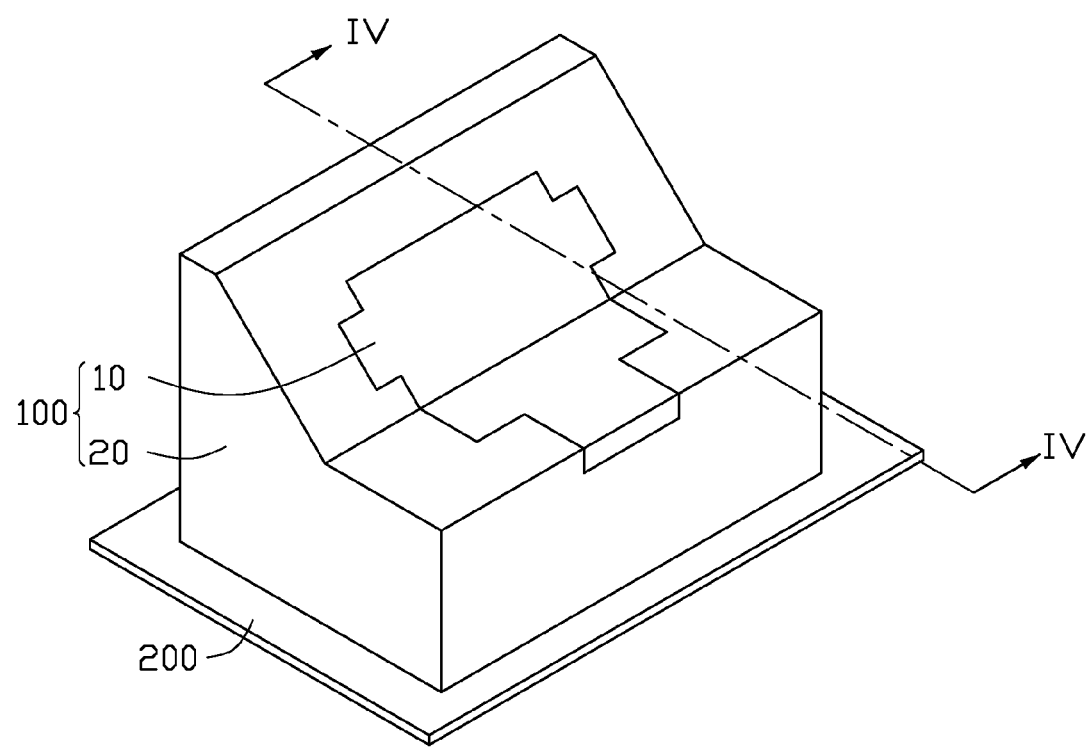
FIG. 3 is an assembled view of an embodiment of an optical communication device.
Figure 4:
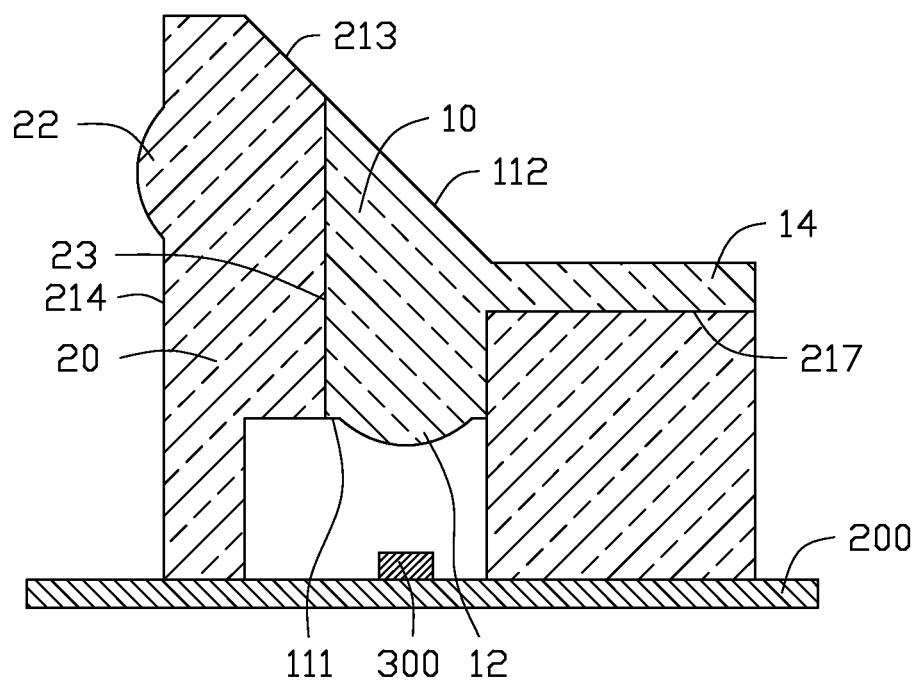
FIG. 4 is a cross-sectional view of FIG. 3 taken along line IV-IV.
Figure 5:
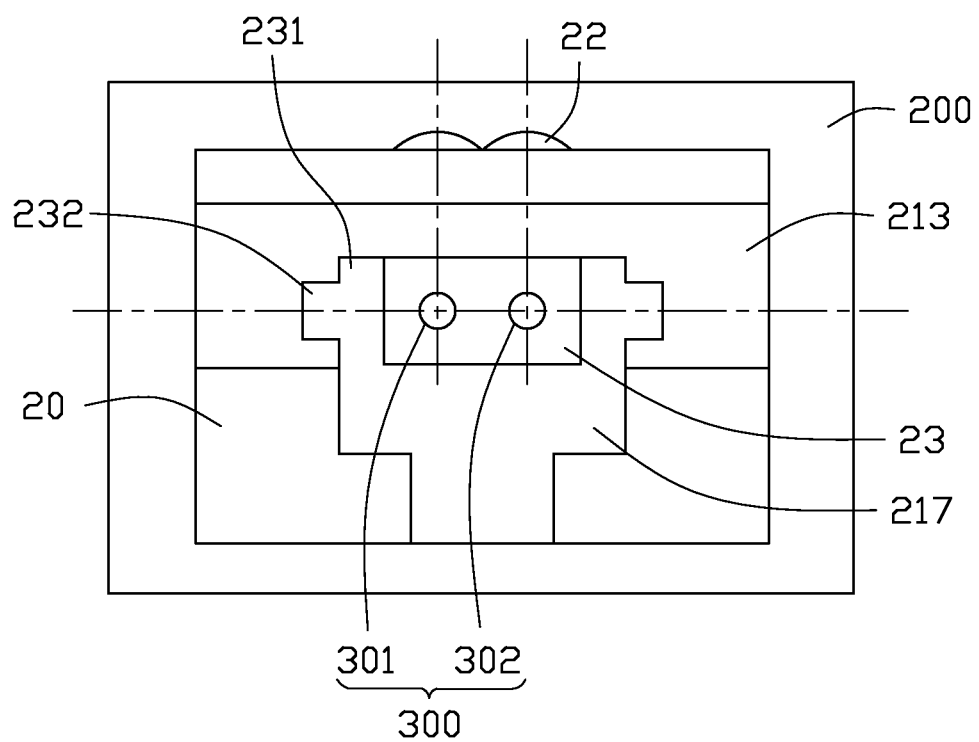
FIG. 5 is a diagrammatic view for assembling the optical communication device of FIG. 3.

FIGS. 3-5 illustrate an embodiment of an optical communication device 1 using the optical coupling lens 100. The optical communication device 1 includes a printed circuit board (PCB) 200, and a photoelectric unit 300 electrically connected to the PCB 200. The photoelectric unit 300 includes an emitter 301 for emitting optical signals, and a receiver 302 for receiving optical signals. An arrangement of the emitter 301 and the receiver 302 corresponds to the arrangement of the first lenses 12 and the second lenses 22. In this embodiment, the emitter 301 is a laser diode, and the receiver 302 is a photodiode.

FIG. 5 illustrates a method for assembling the optical communication device 1. In assembly, the second lens portion 20 is positioned on the PCB 200. The photoelectric unit 300 can be directly seen through the receiving hole 23 to easily determine a position relationship between the photoelectric unit 300 and the second lens portion 20, and it is easy to assemble the second lens portion 20 on a predetermined portion of the PCB 20 to ensure a high transmitting efficiency of the optical communication device 1. In detail, the second lens portions 20 is observed along a direction substantially parallel to the top surface 212. If the optical axes of the second lenses 22 pass through centers of the emitter 301 and the receiver 302, and if a connecting line between the centers of the emitter 301 and the receiver 302 passes through predetermined portions of the second lens portion 20, it is determined that the second lens portion 20 is positioned at the predetermined position of the PCB 200. In this embodiment, the predetermined portions of the second lens portion 20 are central portions of the engaging blocks 232. After the second lens portion 20 is assembled to the predetermined position of the PCB 200, the first lens portion 10 is inserted into the receiving hole 23 of the second lens portion 20, such that the supporting portion 113 is supported on the step 231, the engaging blocks 13 engage into the corresponding engaging grooves 232, and the tail end 14 is received into the receiving recess 217. An engagement between the engaging blocks 13 and the engaging grooves 232 ensures an assembling precision of the first lens portion 10 to the second lens portion 20. The tail end 14 makes an assembling process and a reassembly process of the first lens portion 10 to the second lens portion 20 easy.

In this embodiment, when the first lens portion 10 is assembled to the first second lens portion 20, the reflecting surface 112 is coplanar with the inclined surface 213. Therefore, it can be determined whether the first lens portion 10 is properly assembled to the second lens portion 20 by referring to a position relationship between the reflecting surface 112 and the inclined surface 213.

In use, the reflecting surface 112 reflects optical signals between the first lenses 12 and the second lenses 22, thereby optically coupling the photoelectric unit 30 to optical fibers (not shown).

It is believed that the present embodiments and their advantages will be understood from the foregoing description, and it will be apparent that various changes may be made thereto without departing from the scope of the disclosure or sacrificing all of its material advantages, the examples described herein merely being exemplary embodiments of the disclosure.

What is claimed is:

1. An optical coupling lens comprising:
   a first lens portion comprising:
   a first main body having a first optical surface and a reflecting surface inclined at a predetermined angle relative to the first optical surface; and
   at least one lens formed on the first optical surface; and
   a second lens portion comprising:
   a second main body having a second optical surface,
   a bottom surface substantially perpendicular to the second optical surface, and
   a top surface opposite to the bottom surface; and
   at least one second lens formed on the second optical surface,
   wherein the second lens portion defines a receiving hole passing through the bottom surface and the top surface, and the first lens portion is detachably received in the receiving hole with the first optical surface facing toward the bottom surface, the second lens portion comprises an inclined surface connected to the top surface and inclined at a predetermined angle relative to the top surface, the receiving hole passes through the inclined surface, the inclined surface is coplanar with the reflecting surface when the first lens portion being received in the receiving hole.

2. The optical coupling lens of claim 1, wherein an angle between the first optical surface and the reflecting surface is substantially 45 degrees.

3. The optical coupling lens of claim 1, wherein the first main body comprises:
   a stepped supporting portion located between the first optical surface and the reflecting surface,
   a step formed in the receiving hole, and
   the supporting portion is supported on the step.

4. The optical coupling lens of claim 1, wherein the first lens portion comprises:
   two engaging blocks protruding from two opposite ends of the first main body,
   the second lens portion defining two engaging grooves corresponding to the engaging blocks, and
   the engaging blocks engage into the engaging grooves, respectively.

5. The optical coupling lens of claim 1, wherein the first lens portion comprises a tail end extending from a side of first main body, the second lens portion corresponding to the tail end, the receiving recess is defined in the top surface and communicated with the receiving recess, and the tail end is received into the receiving recess.

6. The optical coupling lens of claim 5, wherein the recess passes through an outer surface of the second main body.

7. An optical communication device comprising:
   a printed circuit board;
   a photoelectric unit electrically connected to the printed circuit board; and
   an optical coupling lens positioned on the printed circuit board and covering the photoelectric unit, the optical coupling lens comprising:
   a first lens portion comprising:
   a first main body having a first optical surface and a reflecting surface inclined at a predetermined angle relative to the first optical surface; and
   at least one first lens formed on the first optical surface; and
   a second lens portion comprising:
   a second main body having a second optical surface,
   a bottom surface substantially perpendicular to the second optical surface, and
   a top surface opposite to the bottom surface; and
   at least one second lens formed on the second optical surface,
   wherein the second lens portion defines a receiving hole passing through the bottom surface and the top surface, the first lens portion is detachably received in the receiving hole with the first optical surface facing toward the bottom surface, and the first lens is optically aligned with the photoelectric unit, the second lens portion comprises an inclined surface connected to the top surface and inclined at a predetermined angle relative to the top surface, the receiving hole passes through the inclined surface, the inclined surface being coplanar with the reflecting surface when the first lens portion is received in the receiving hole.

8. The optical communication device of claim 7, wherein an angle between the first optical surface and the reflecting surface is substantially 45 degrees.

9. The optical communication device of claim 7, wherein the first main body comprises a stepped supporting portion between the first optical surface and the reflecting surface, a step is formed in the receiving hole, and the supporting portion is supported on the step.

10. The optical communication device of claim 7, wherein the first lens portion comprises two engaging blocks protruding from two opposite ends of the first main body, the second lens portion defines two engaging grooves corresponding to the engaging blocks, and the engaging blocks engage into the engaging grooves, respectively.

11. The optical communication device of claim 7, wherein the first lens portion comprises a tail end extending from a side of first main body, the second lens portion corresponding to the tail end, the receiving recess is defined in the top surface and communicated with the receiving recess, and the tail end is received into the receiving recess.

12. The optical communication device of claim 11, wherein the recess passes through an outer surface of the second main body.

13. A method for assembling an optical communication device, the communication device comprising a printed circuit board, a photoelectrical electrical connected to the printed circuit board, and an optical coupling lens comprising a first lens portion and a second lens portion, the first lens portion comprising a main body having a first optical surface and a reflecting surface inclined at a predetermined angle relative to the first optical surface and at least one first lens formed on the first optical surface, the second lens portion comprising a second main body having a second optical surface, a bottom surface substantially perpendicular to the second optical surface, and a top surface opposite to the bottom surface, and at least one second lens formed on the second optical surface, the second lens portion defining a receiving hole passing through the bottom surface and the top surface for receiving the first lens portion therein, the second lens portion comprises an inclined surface connected to the top surface and inclined at a predetermined angle relative to the top surface, the receiving hole passes through the inclined surface, the inclined surface being coplanar with the reflecting surface when the first lens portion is received in the receiving hole; the method comprising:

positioning the second lens portion on the printed circuit board, observing the second lens along a direction substantially perpendicular to the top surface and adjusting a positioned of the second lens portion relative to the photoelectric unit the second lens portion being at a predetermined assembling position of the printed circuit board; and inserting the first lens portion into the receiving hole of the second lens portion.

* * * * *